United States Patent [19]

Ho

[11] Patent Number: 4,809,299

[45] Date of Patent: Feb. 28, 1989

[54] FREQUENCY INDEPENDENT INFORMATION TRANSMISSION SYSTEM

[76] Inventor: Kit-Fun Ho, P.O. Box 54504, North Point, Hong Kong

[21] Appl. No.: 853,480

[22] Filed: Apr. 18, 1986

[51] Int. Cl.$^4$ ............................................. H03M 7/00
[52] U.S. Cl. ........................................ 375/48; 375/89; 375/62; 340/825.73; 340/825.75
[58] Field of Search .......... 375/48, 23, 45, 88, 375/89, 62, 66; 178/66.1, 2 B, 26 A, 30, 79, 89; 340/825.64, 825.73, 825.75, 825.76; 455/37

[56] References Cited

U.S. PATENT DOCUMENTS

| | | | |
|---|---|---|---|
| 3,866,124 | 2/1975 | Wycoff | 340/825.73 |
| 4,430,652 | 2/1984 | Rothenbuhler et al. | 375/23 |
| 4,499,462 | 2/1985 | Stoesser et al. | 340/825.64 |
| 4,660,215 | 4/1987 | Horiike et al. | 375/48 |

FOREIGN PATENT DOCUMENTS 2165724A 4/1986 United Kingdom.
2178275A 2/1987 United Kingdom.

Primary Examiner—Benedict V. Safourek
Assistant Examiner—Andrew J. Telesz, Jr.
Attorney, Agent, or Firm—Thomas R. Vigil

[57] ABSTRACT

The system is used for transmitting information wherein each possible message unit in a set, (e.g. the alphanumeric symbol set) is defined by a specific interval ($I = f_s/f_{RR}$) and messages are transmitted by conversion to the interval code and for the sending of signals of any two frequencies ($f_s$ and $F_R$) that are related by the specific intervals. The signals are received by a receiver which computes the interval, matches it with the predefined message unit interval and outputs that message unit. A sequence of message units may be sent using a reference frequency signal and a succession of specific signals each related to the reference frequency by the specific interval for that message unit. A computer program can be utilized for automatically encoding or decoding. The system has the advantages that it is relatively free of errors caused by long term frequency shifting, allows transmission at any frequency level, and allows interacting communication between stations wherein the transmitters operate in entirely different frequency domains. In particular, the system is operable to transmit information in the form of interval-coded tones suitable for interpretation by a human listener. Examples of the use of the system include a clock and a voltmeter comprising tone output circuitry.

38 Claims, 8 Drawing Sheets

FIG. 4. MESSAGE-INTERVAL CODING TABLE (MI TABLE)

$$M \rightleftarrows I = \frac{f_S}{f_R} = \frac{T_R}{T_S} = \frac{D_R}{D_S}$$

| M | I | $T_R$ | $T_S$ | $f_R$ | $f_S$ | $D_R$ | $D_S$ |
|---|---|---|---|---|---|---|---|
| $M_1$ | $I_1$ | $T_R$ | $T_{S1}$ | $f_R$ | $f_{S1}$ | $D_R$ | $D_{S1}$ |
| $M_2$ | $I_2$ | $T_R$ | $T_{S2}$ | $f_R$ | $f_{S2}$ | $D_R$ | $D_{S2}$ |
| ⋮ | ⋮ | ⋮ | ⋮ | ⋮ | ⋮ | ⋮ | ⋮ |
| $M_m$ | $I_m$ | $T_R$ | $T_{Sm}(=\frac{T_R}{I_m})$ | $f_R$ | $f_{Sm}(=I_m \cdot f_R)$ | $D_R$ | $D_{Sm}(=\frac{D_R}{I_m})$ |

Column labels (with descriptions):
- M — MESSAGE
- I — INTERVAL
- $T_R$ — REFERENCE PERIOD, PROGRAMMABLE
- $T_S$ — SIGNAL PERIOD
- $f_R$ — REFERENCE FREQUENCY, PROGRAMMABLE
- $f_S$ — SIGNAL FREQUENCY
- $D_R$ — REFERENCE "HALF-CYCLE" DURATION, PROGRAMMABLE
- $D_S$ — SIGNAL "HALF-CYCLE" DURATION

A SET OF MESSAGES

FREQUENCY INDEPENDENT INFORMATION TRANSMISSION SYSTEM

BACKGROUND OF THE INVENTION

1. Field of the Invention

The present invention relates to the transmission of information and is especially concerned with a code transmission system.

2. Description of the Prior Art

Numerous sytems for the transmission of information have been proposed. See, for example, U.S. Pat. Nos. 3,366,737 issued to Brown, Jr. for "MESSAGE SWITCHING CENTER FOR ASYNCHRONOUS START-STOP TELEGRAPH CHANNELS", 3,627,951 issued to Batin for "ASYNCHRONOUS COMMUNICATIONS SYSTEM CONTROLLED BY DATA PROCESSING DEVICE", 3,633,172 issued to Eggimann et al. for "MEANS FOR AND METHOD OF ADDRESS-CODED SIGNALING", 3,796,835 issued to Closs et al. for "SWITCHING SYSTEM FOR TDM DATA WHICH INDUCES AN ASYNCHRONOUS SUBMULTIPLEX CHANNEL", 3,988,545 issued to Kuemmerle et al. for "METHOD OF TRANSMITTING INFORMATION AND MULTIPLEXING DEVICE FOR EXECUTING THE METHOD", 4,154,983 issued to Pedersen for "LOOP CARRIER SYSTEM FOR TELECOMMUNICATION AND DATA SERVICES", and 4,390,985 issued to Fourcade et al. for "DEVICE FOR THE SYNCHRONIZATION OF DIGITAL DATA TRANSMITTED IN PACKETS".

SUMMARY OF THE INVENTION

The present invention is directed to a system for transmitting information wherein the information consists of series of specific message units out of a set of possible units, (e.g. a word message made out of the 26 letters of the alphabet) and includes the step of defining an interval for each of the members of the set. Then the message is converted into a signal of a reference frequency signal and a series of information signals each having a frequency related to the reference signal's frequency by the interval so defined. Next this message is transmitted. This set of signals can then be translated back to the message by a receiver that compares the received signals to determine their intervals and compares the intervals so derived to the defined interval.

The system may be readily adapted to be machine implemented using a digital computer and encompasses a transmitter and a receiver for carrying out the process.

Since an interval is used, the message can be sent and recognized despits shifts in frequency from one message to another or despite uniform shifts in frequencies. The system has the following advantages:

The Message-Interval Coding in the system is frequency independent and, hence, portable across the frequency spectrum.

The Message-Interval Coding of the system forms a smart system because a message, identified by a particular interval, can be conveyed at higher or lower frequencies.

The system affords great freedom in hardware design.

The system permits different machines to talk at higher or lower frequencies while conveying the same Interval-Coded Message.

The system makes high-frequency machines compatible with low-frequency machines.

With the Message-Interval Coding of the system, a wide-band machine listener is capable of understanding both high-frequency and low-frequency transmitters which convey the same Interval-Coded Message.

The system provides a smart machine transmitter because the transmitter can convey a particular Inverval-Coded Message at higher or lower frequencies.

Furthermore, the transmitter of the system can be employed in another manner to transmit information in the form of Interval-Coded audible tones for direct interpretation by a human listener. When used in this manner, the machine receiver of the system may be omitted. Examples, including a clock and a voltmeter comprising such tone transmitter, are also disclosed.

The system, together with the advantages thereof, may best be understood by reference to the following description taken in connection with the accompanying drawings, in the several figures of which, like reference numerals identify like elements.

BRIEF DESCRIPTION OF THE DRAWINGS

FIG. 4 is a table for use with the system of the present invention.

DESCRIPTION OF THE PREFERRED EMBODIMENT

Figure 1:
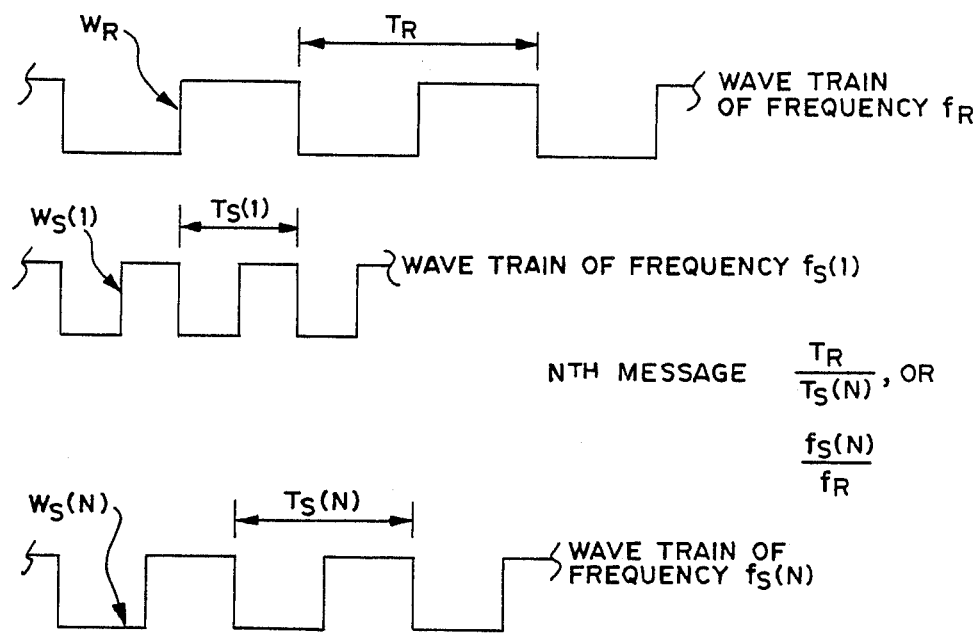
FIG. 1 is a set of waveforms useful in explaining the system of the present invention.

Referring to the drawings and especially to FIG. 1, the processes of the present invention may be appreciated from the following description with reference to FIG. 1.

It should be noted that while square waves are depicted in the drawings, the principles explained apply to any shaped periodic waveform.

The system or process of the present invention uses the Interval I, between two frequencies of a waveform such as waveforms $W_R$ and WS(1) of FIG. 1 to identify specific messages or items of information (e.g. the letter "A") from a table of such messages. These frequencies may be designated fR for a reference frequency and fS for a signal frequency. Then the Interval I may be defined by the following equation:

$$I = f_S/f_R$$

Using the usual definition of the periodic T of a wave as the inverse of its frequency (T=1/f) this becomes:

$$I = T_R/T_S = D_R/D_S$$

where $D_R$ and $D_S$ represent the duration of a half cycle of the waveform WR or WS.

Each interval in a table of intervals can be assigned a different specific message. With reference to FIG. 1, then, the two waveforms $W_R$ and WS(1) would define an interval:

$$I_S(1) = \frac{T_R}{T_S(1)}$$

Taking the general case, any waveform $W_{S(N)}$ would define an interval:

$$I_{S(N)} = \frac{T_R}{T_{S(N)}} = \frac{f_{S(N)}}{f_R}$$

and by defining a message unit, Nth Message, the two waveforms $W_R$ and WS(N) yield this $N^{th}$ Message unit $M_{(N)}$. If the value of $I_{S(N)}$ equals $I_k$ in the table, which has been assigned a specific message member $M_k$, then M(N) equals $M_k$.

FIG. 4 is one such generalized table. As a concrete example, let us assume we wish to transmit a message using the English alphabet. We could then make up a table such as this:

TABLE I

| MESSAGE UNITS | INTERVAL $2^{\wedge}$ (M/24) |
|---|---|
| A | 1.000000 |
| B | 1.029302 |
| C | 1.059463 |
| D | 1.090507 |
| E | 1.122462 |
| F | 1.155352 |
| G | 1.189207 |
| H | 1.224053 |
| I | 1.259921 |
| J | 1.296839 |
| K | 1.334839 |
| L | 1.373953 |
| M | 1.414213 |
| N | 1.455653 |
| O | 1.498307 |
| P | 1.542210 |
| Q | 1.587401 |
| R | 1.633915 |
| S | 1.681792 |
| T | 1.731073 |
| U | 1.781797 |
| V | 1.834008 |

TABLE I-continued

| MESSAGE UNITS | INTERVAL $2$ (M/24) |
|---|---|
| W | 1.887748 |
| X | 1.943063 |
| Y | 2.000000 |
| Z | 2.058604 |
| Space | 2.118926 |
| etc. | |

Thus, a message unit for "Y" could be translated from two waveforms WR and WS wherein the frequency of WR was 10 KHz and that of WS 20 KHz. Note that it could also be 1 KHz and 2 KHz or 1.13 MHz and 2.26 MHz.

(Of course, in a practical receiver of this system any interval within a range about the above precise values would be accepted as being that interval.)

Figure 2:
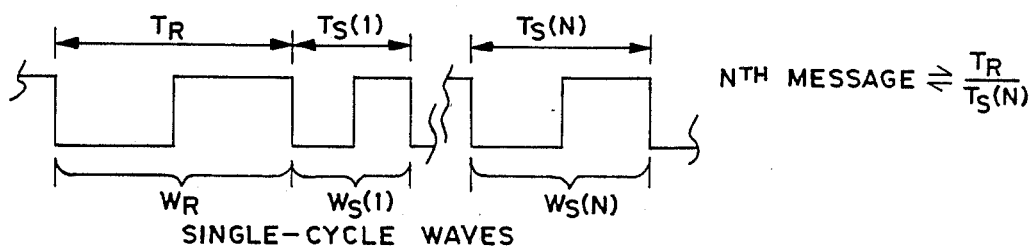
FIG. 2 is another waveform illustrating one aspect of the system of the present invention.
Figure 3:
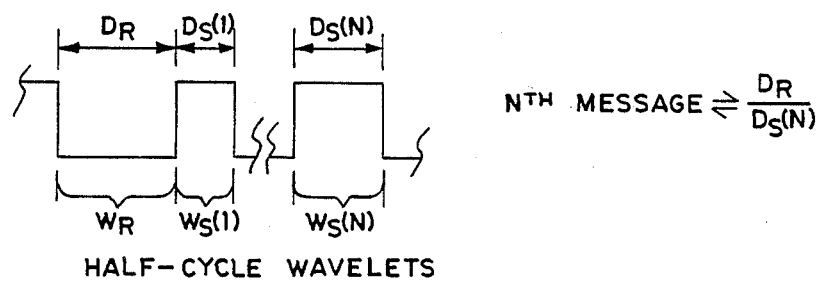
FIG. 3 is yet another waveform for illustrating another aspect of the system of the present invention.

The waveforms $W_R$ and $W_{S(1)}$, etc. can be transmitted sequentially as shown in FIG. 2 and even single cycles of the waveforms used as there shown. However, in most practical systems it is preferred that the waveforms $W_R$, WS(1), etc. persist for a number of cycles so as to make the detection of them accomplished easily and with less precise equivalence. However, this is not necessary for even as short a duration as one half cycle $D_R$, DS(1), DS(N) can be used as illustrated in FIG. 3. Again, in this case each message unit is represented by the interval defined by the equation there set out.

TRANSMITTER

Figure 5:
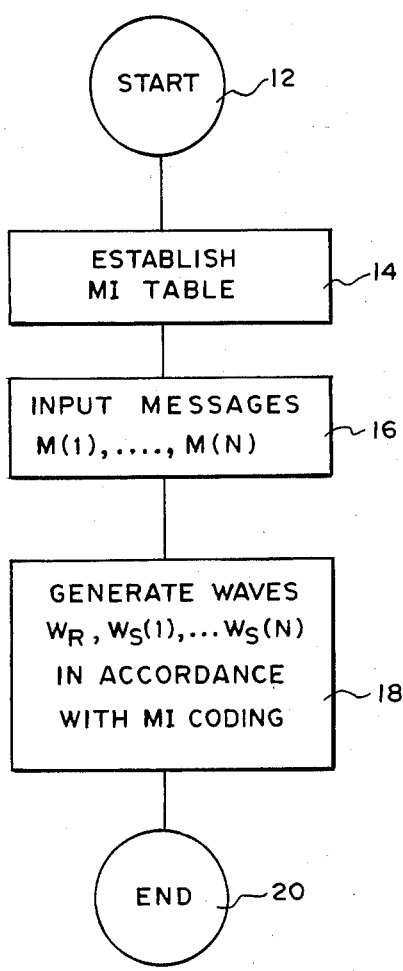
FIG. 5 is a flow chart useful in illustrating the overall operation of the system.

FIG. 5 shows the steps in practicing the process of the present invention in the conventional computer flow chart manner. From a start at 12, the first step 14 is to establish the message interval (MI) Table (step 14). The next step 16 is to input specific message units M(1). . . M(N) (for example, the letters and spaces NOW IS THE TIME . . . AID . . . using Table I above.) at step 16 and select the corresponding intervals from the MI Table of step 14. The final step 18 is to generate the waves $W_R$, WS(1), etc. in accordance with the input of step 16 and when this is done the operation is over at step 20.

Figure 6:
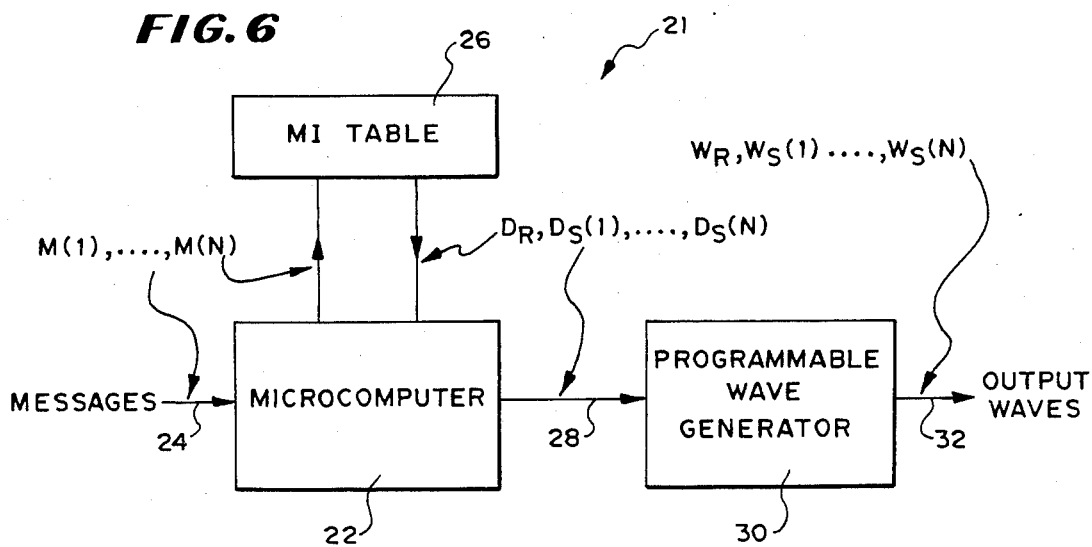
FIG. 6 is a block diagram of a system for producing or transmitting signals constructed in accordance with the system of the present invention.

A transmitter 21 for carrying out the process of FIG. 5 is shown in FIG. 6 wherein a microcomputer 22 receives the message units (e.g. through a keyboard) at input 24 and selects the proper intervals from a MI Table unit 26. (This table may take the form of a ROM chip or any other suitable source). The microcomputer 22 derives a succession of signals for a reference waveform and message waveforms and supplies them to an output 28. These can be, for example, the duration of half-cycles of the waveforms $D_R$, DS(1). The output 28 feeds a programmable wave generator 30 which produces the output wave $W_R$, WS(1), etc. on its output 32. This latter output 32 may be fed to a suitable transmission vehicle such as a transmission line or optic fiber or broadcast antenna.

This transmitter has been constructed and successfully operated using a BBC Microcomputer Model B. This Microcomputer contains a 6502 CPU and two 6522 Versatile Interface Adaptors, where one of which, the USER VIA, is already connected to the Model B's USER PORT for user applications. A more detailed flow chart for this particular and currently preferred method of carrying out the invention is shown in FIG. 7.

In this particular case, the microcomputer 22 may serve as not only the microcomputer 22, but by placing the Table MI in its RAM as the table 26, the USER VIA section can be operated as the generator 30 wherein the output waves are obtained across the standard circuit points identified as PB7 and OV at the USER PORT of this commercially available computer.

Figure 7:
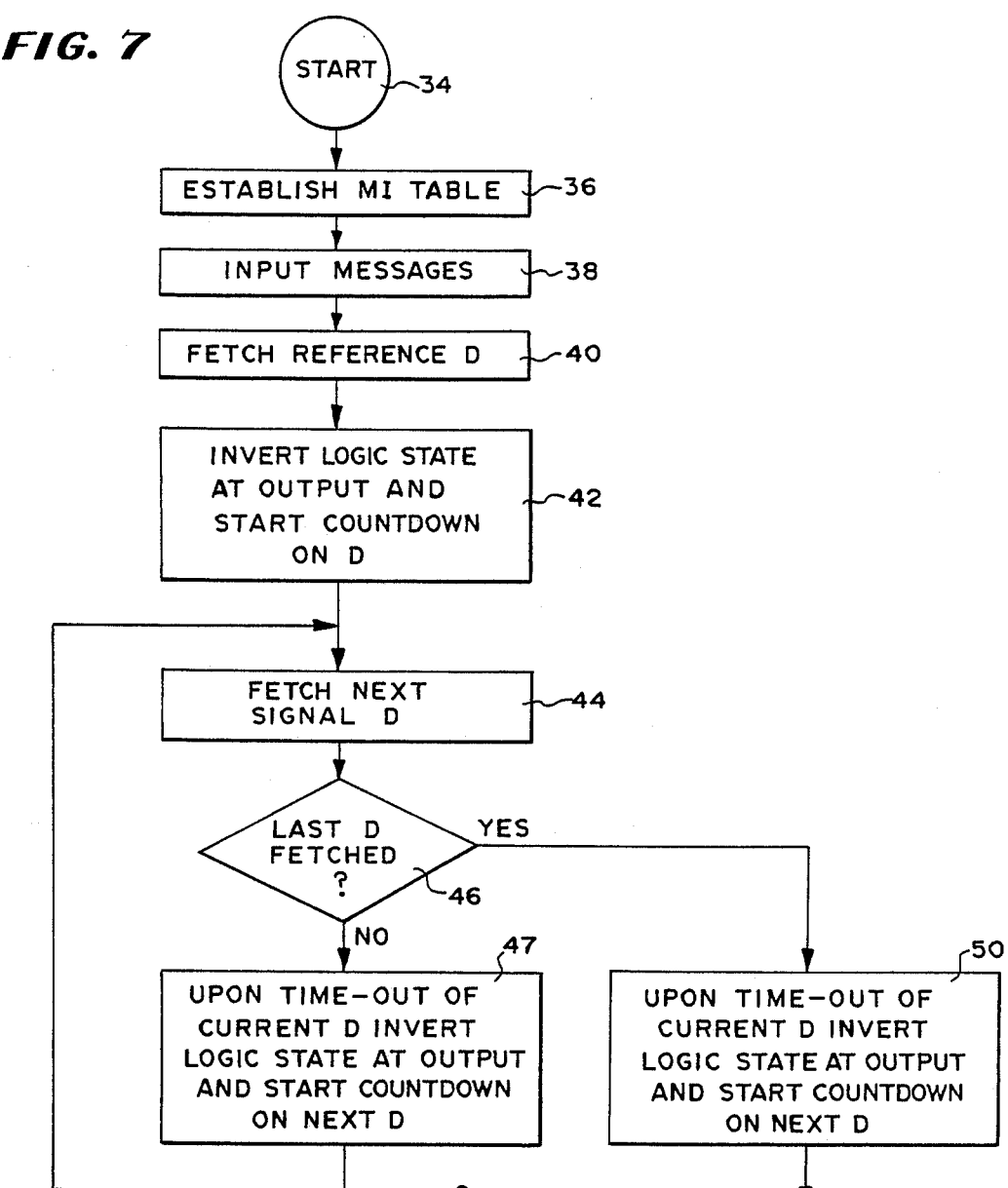
FIG. 7 is a more detailed flow chart useful for illustrating the operation of the system shown in FIG. 6.

The flow chart of FIG. 7 includes a start command 34 which establishes a MI Table at step 36 and accepts input messages at step 38. In response to the first of these steps, it fetches a pre-selected reference D (half-cycle) at step 40 and in the next stage 42, inverts the logic state at the output and starts a countdown on D. Before the conclusion of this countdown it fetches the next signal D (i.e., DS(1), etc.) in function block 44. If this is not the last D fetched (test block 46) the system responds as indicated in block 47 to restart the process of selecting the next D. If the answer to test 46 is "yes", the system responds as indicated by logic block 50 to proceed to countdown on the last D and as indicated by block 52 to invert logic at the output and proceed to end at 54.

The program for carrying out this operation is as follows:

```
                Transmitter Program I
10    REM INVENTED BY HO KIT-FUN
15    REM UNPUBLISHED COPYRIGHT
20    REM
40    REM NORTH POINT
50    REM HONG KONG
60    REM
80    REM PRESTOB18G
85    REM
90    ?&FE6B=&CO : REM SET USER 6522 AT FREE-
      RUNNING MODE
92    ?&FE62=&80 : REM INITIALIZE OUTPUT (SET
      PB7 AT HIGH)
94    ?&FE6E=&00 : REM INTERRUPT DISABLED
100   REM
110   REM ESTABLISH MESSAGE-INTERVAL CODING
      TABLE
120   DR=3000 : REM SET REFERENCE "HALF-CYCLE"
      DURATION, PROGRAMMABLE
130   DELAY%=2
140   DSH%=&0DA0 : DSL%=&0DC0 : REM LOCATION
      OF MI TABLE
150   FOR M = 0 TO 31
170   REM FOR EXAMPLE 32-STATE MESSAGES IN
      THIS DEMONSTRATION
180   REM (EACH MESSAGE HAS THE SAME INFOR-
      MATION CONTENT AS 5 BINARY BITS)
200   DS% = INT 2^(-M/24)*DR : REM COMPUTE
      SIGNAL "HALF-CYCLE" DURATION
210   REM MESSAGES MESSAGES CODED BY
220   REM INTERVALS 2^(0/24), 2^(1/24), 2^(2/24), ...,
      2^(31/24)
230   DS%=DS%-DELAY% : REM DELAY
      CORRECTION
232   REM TRUE DURATION = PROGRAMMED
      DURATION + DELAY
235   DSH%?M=DS% DIV 256
238   DSL%?M=DS% MOD 256
240   NEXT M
290   REM INPUT MESSAGES
300   N=128 : REM TAKE N INPUT MESSAGE UNITS
      (N=1,5,16,64 ETC., PROGRAMMABLE)
320   DTA%=&3000 : ?DTA%=N
330   FOR NUM% = N TO 1 STEP -1
340   M=GET : REM SPECIFIC MESSAGE UNIT OF A
      DEPRESSED KEY
342   IF M=32 THEN M=27 ELSE M=M-65
350   DTA%?(NUM%)=M
360   NEXT
390   REM USING THE USER VIA
400   REM GENERATE WAVES
410   REM IN ACCORDANCE WITH MI TABLE
```

```
                -continued
                Transmitter Program I
420   FOR PASS = 0 TO 3 STEP 3
430   P%=&0D00
440   [
450   OPT PASS
500   LDA DSL%
510   STA &FE64    LOAD 16-BIT COUNTER
520   LDA DSH%     WITH
530   STA &FE65    REFERENCE DURATION
540   LDX DTA%
550   .LOOP LDA DTA%,X
560   TAY
570   LDA DSL%,Y
580   STA &FE66    LOAD 16-BIT LATCH
590   LDA DSH%,Y   WITH
600   STA &FE67    SIGNAL DURATION
620   .STS BIT &FE6D
630   BVC STS      WAIT TILL A TIME-OUT
640   DEX
650   BEQ STP
660   JMP LOOP
690   .STP LDA #&80
700   STA &FE6B
710   RTS
720   ]
730   NEXT PASS
740   CALL &0D00
770   END
```

The flow chart of FIG. 7 and this program consist of the procedure used to realize a machine which conveys a message by producing INTERVAL-CODED "HALF-CYCLE" WAVELETS like those shown in FIG. 3. It follows that by generating each of such "HALF-CYCLE" twice one obtains "SINGLE-CYCLE" WAVES like those shown in FIG. 2. And by generating each of such "HALF-CYCLE" several times one obtains WAVE TRAINS like those in FIG. 1.

Figure 8:
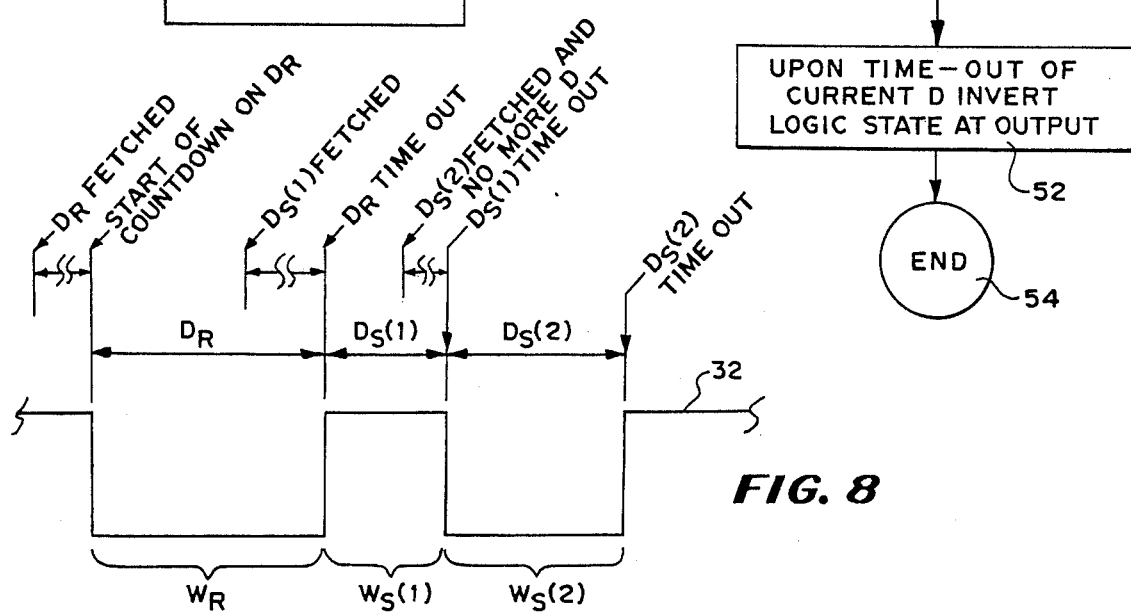
FIG. 8 is a waveform diagram illustrating a feature of the system of the present invention.

The output produced by the system of FIGS. 6 and 7 is shown in FIG. 8 wherein the output at line 32 is depicted from the reference $D_R$ and the $D_S(1)$ and $D_S(2)$ with the various logic events depicted in their timed relationship to the output.

RECEIVER

Figure 9:
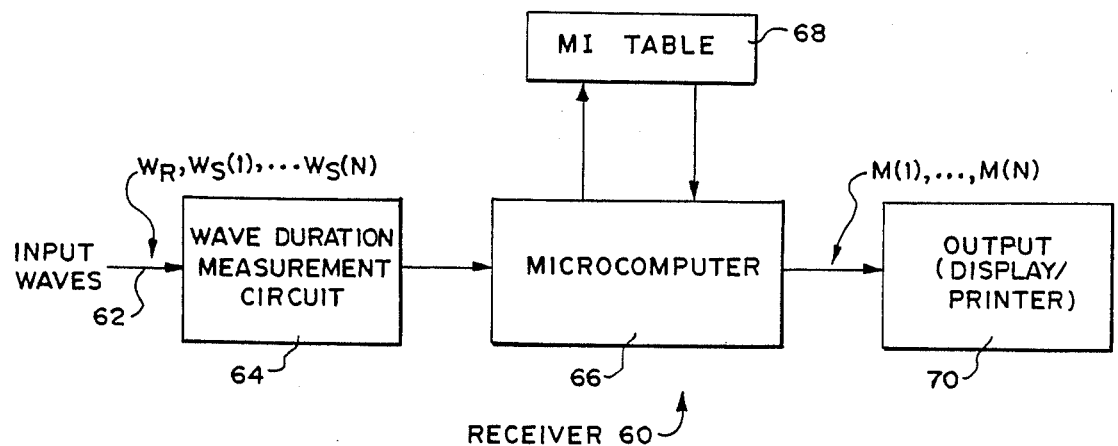
FIG. 9 is a block diagram of a receiver system constructed in accordance with the principles of the present invention.

Referring to FIG. 9, there is depicted a receiver 60 having an input 62, on which the waveforms WR, WS(1), ... WS(N) are received from a suitable transmission media such as a transmission line or optic fiber or antenna. This input 62 delivers the waveforms to a wave duration measurement circuit 64 which serves to measure the duration D and feeds a succession of duration information on DR, DS(1), etc. to a microcomputer 66. An MI Table 68 which is substantially similar to that of the transmitter sending the signals WR, WS(1), etc. is provided and the computer computes the intervals and derives from the table 68 the message unit M(1), ... .M(N). These message units are fed to a suitable output 70 such as a Cathode Ray Tube display or a printer or both.

The MI Table 26 of the transmitter 21 would be one of precise intervals but as stated above the receiver should recognize calculated intervals within a range of values about the precise values. This can be done by having the program select the closest interval or by having the MI Table 68 at the receiver contain a range. The system currently utilizes this latter approach and has the following MI Table 68 for the receiver 60 for the particular message unit given above:

TABLE II

| MESSAGE UNIT | INTERVAL BOUNDARY $2^{(M-0.5)/24}$ |
|---|---|
| A | 0.985663 |
| B | 1.014545 |
| C | 1.044273 |
| D | 1.074873 |
| E | 1.106369 |
| F | 1.138788 |
| G | 1.172157 |
| H | 1.206504 |
| I | 1.241857 |
| J | 1.278247 |
| K | 1.315702 |
| L | 1.354255 |
| M | 1.393938 |
| N | 1.434783 |
| O | 1.476826 |
| P | 1.520100 |
| Q | 1.564642 |
| R | 1.610490 |
| S | 1.657681 |
| T | 1.706255 |
| U | 1.756252 |
| V | 1.807714 |
| W | 1.860684 |
| X | 1.915206 |
| Y | 1.971326 |
| Z | 2.029090 |
| Space | 2.088547 |
| etc. | 2.149746 |

That is, in the TRANSMITTER 21, the MI Table 26 is in the form of message-wave duration correspondence, and in the RECEIVER 60, the MI Table 68 is in the form of message-interval boundary correspondence.

The MI Table in TABLE I can be an example of 32-state coding, where each message unit has the same information content as 5 binary bits, i.e. 1 out of 32. From TABLE I it is apparent that similar MI Tables for coding 4-, 8-, 10-, and 24-state messages, etc. may be used.

The receiver computer 66 may also be a BBC Microcomputer Model B which is programmed in accordance with the flow diagram of FIG. 10 and the program given below. In this case the MI Table 68 is again held in the RAM.

The receiver 60 may not be easily made from just the aforementioned computer but requires a wave measurement circuit 64. One preferred circuit 64 is depicted in FIG. 11.

Figure 11:
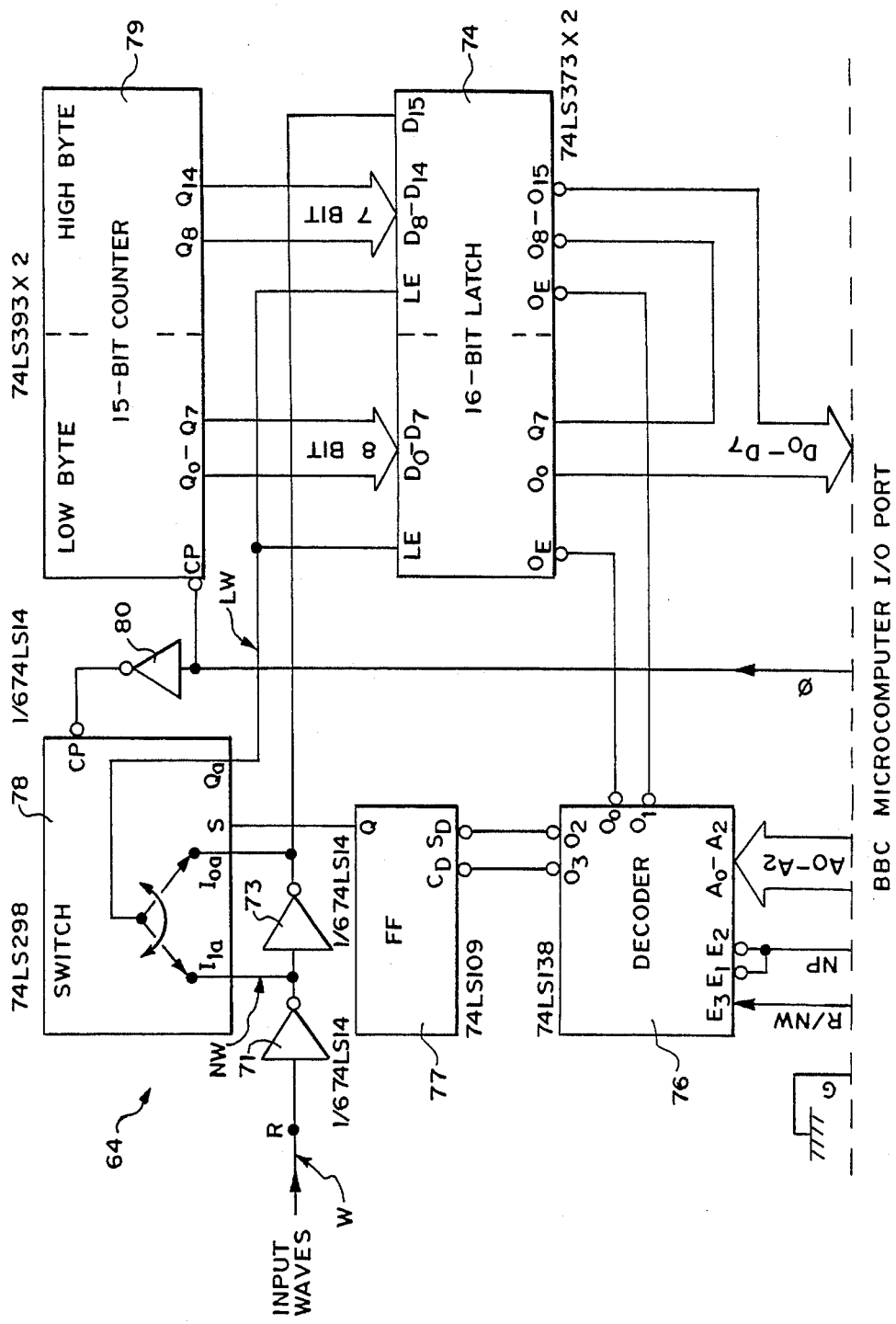
FIG. 11 is a circuit and block diagram of one particular embodiment for part of the system shown in FIG. 9.

The elements, values and interconnection of the circuit are given in FIG. 11. The circuit of FIG. 11 is connected to the I/O port known as the 1-MHz Extension Bus of the BBC Microcomputer. The conductors R/NW, NP, A0, A1, A2, $\phi$, D0, D1, D2, D3, D4, D5, D6, D7, and G of the circuit of FIG. 11 are respectively connected to R/NW, NPGFC, A0, A1, A2, 1MHz, D0, D1, D2, D3, D4, D5, D6, D7 and OV of The 1-MHz Extension Bus.

In overall operation, the circuit 64 serves to measure the time instant at the occurrence of each waveform transition of the input wave and present this information to the Microcomputer 66.

Figure 12:
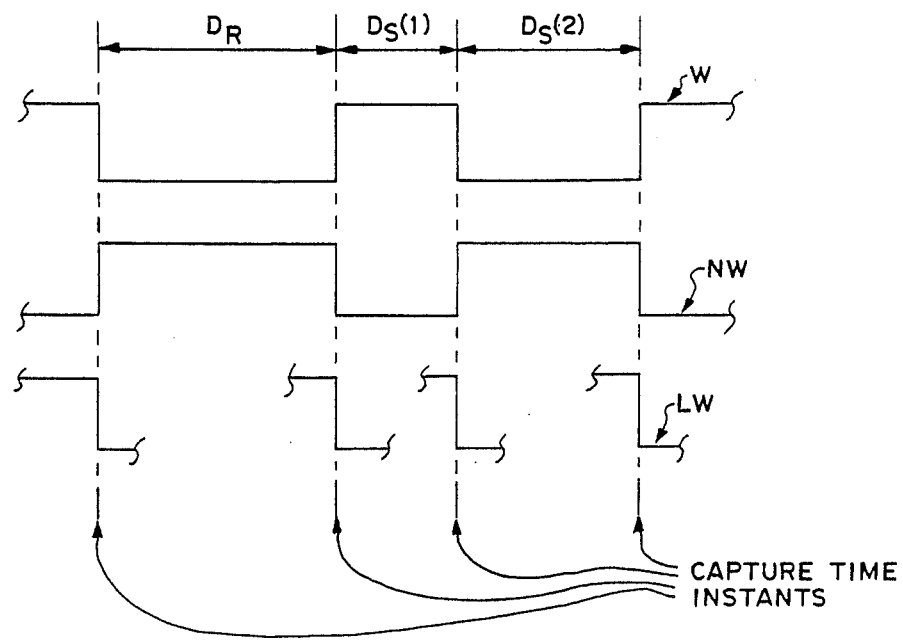
FIG. 12 is a set of waveforms useful in illustrating the operation of the system of the invention.

At the input R of the circuit 64 the received wave W is fed to inverting buffer 71 to produce at its output an inverted wave NW which is inverted once again by inverter 73 to recover an uninverted wave W at the most significant bit D15 of a 16-bit latch 74. By using decoder 76, flip-flop 77 and switch 78 the computer 66 selectively feeds the waveform W or NW, alternately, to LE to produce a time-related latching waveform LW, which may be illustrated with FIG. 12. By sensing the HIGH or LOW voltage level of and, hence, transition in the waveform W at D15 the computer 66 (a) initializes LW to HIGH, (b) detects the occurrence of waveform transition in W, (c) takes a latched counter reading at 74 captured from counter 79 by a HIGH-to-LOW TRANSITION in LW, and (d) resets LW to HIGH to unlatch 74 for another capture. Clock pulses $\phi$ are provided (e.g. from computer 66) to operate the counter 79 and through inverter 80 to operate switch 78. The captured counter readings obtained in this manner provide information on durations $D_R$, DS(1), etc. of the received waveform W.

Figure 10:
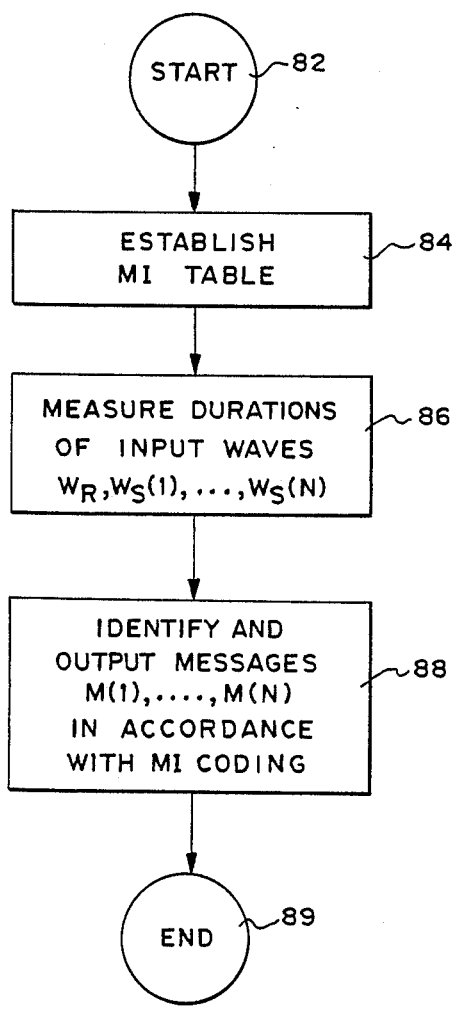
FIG. 10 is a flow chart illustrating the operation of the system shown in FIG. 9.

Referring to FIG. 10 the program upon start 82 initially establishes the MI Table in its RAM at step 84, e.g. by copying it from a disc drive or other more permanent memory. (In the case of a dedicated receiver this could take the form of a ROM chip). Thereafter, at block 86, it measures the duration (with unit 64) of the received waves and, at block 88, identifies the intervals and message units in accordance with the MI Table and when completed terminates the program at end 89.

At suitable program that has been successfully operated in the aforementioned particular computer is as follows:

Receiver Program I

```
5000  REM INVENTED BY HO KIT-FUN
5001  REM UNPUBLISHED COPYRIGHT
5002  REM
5004  REM P.O. BOX 54504
5006  REM NORTH POINT
5008  REM HONG KONG
5010  REM
5020  REM PRESTOL15F
5050  N=128 : REM NUMBER OF SIGNALS
5060  n=N+1 : REM NUMBER OF WAVES
5070  CONSTANT1%=128*256
5080  DIM Ibound(32),DSB%(32),CTIME%(n),DURATION%(N),
      STORAGE%(N),M(N)
5090  HTIME=&5500
5100  LTIME=HTIME+n+1
5105  STORAGE%=&4000 : REM STORAGAE LOCATION
5108  FOR M=0 TO 32:Ibound(M)=2 ((M−0.5)/24):NEXT :
      REM INTERVAL BOUNDARIES
5110  W=&FC03 :REM WAVEFORM W
5120  NW=&FC02 :REM WAVEFORM NW
5130  HBYTE=&FC01 :REM 16-BIT LATCH LOCATION
```

| | Receiver Program I |
|---|---|
| 5140 | LBYTE=&FC00 :REM 16-BIT LATCH LOCATION |
| 5150 | FOR PASS=0 TO 3 STEP 3 |
| 5160 | P%=&D00 |
| 5170 | [ |
| 5180 |     OPT PASS |
| 5190 |     LDY#0 |
| 5200 |     LDA HBYTE \READ HIGH BYTE OF 16 BIT LATCH |
| 5210 |     BMI WAVE |
| 5220 | .NWAVE LDA NW \SWITCH TO NW WAVE |
| 5230 | .NWATI LDA HBYTE |
| 5240 |     BPL NWATI |
| 5250 |     AND #127 |
| 5260 |     STA HTIME,Y |
| 5270 |     LDA LBYTE |
| 5280 |     STA LTIME,Y |
| 5300 |     CPY #n |
| 5310 |     BEQ STOP1 |
| 5315 |     INY |
| 5320 | .WAVE LDA W \SWITCH TO W WAVE |
| 5330 | .WATI LDA HBYTE |
| 5340 |     BMI WATI |
| 5350 |     STA HTIME,Y |
| 5360 |     LDA LBYTE |
| 5370 |     STA LTIME,Y |
| 5390 |     CPY #n |
| 5400 |     BEQ STOP1 |
| 5405 |     INY |
| 5410 |     JMP NWAVE |
| 5420 | .STOP1 RTS |
| 5430 | ] |
| 5440 | NEXT |
| 5450 | CALL &0D00 |
| 5470 | REM COUNTER TIME CAPTURED (i.e. CAPTURED TIME INSTANT) |
| 5480 | FOR Y=0 TO n |
| 5490 | CTIME%(Y) = (?(HTIME+Y))*256+?(LTIME+Y) |
| 5500 | NEXT |
| 5520 | REM DURATION |
| 5530 | FOR Y=0 TO N |
| 5540 | DURATION%(Y) = CTIME%(Y+1) − CTIME%(Y) |
| 5550 | IF DURATION%(Y) < 0 THEN DURATION%(Y) = DURATION%(Y) + CONSTANT1% |
| 5552 | NEXT |
| 5555 | REM MESSAGE-INTERVAL TABLE AND MESSAGE IDENTIFICATION |
| 5560 | DSB%(0)= INT DURATION%(0)/Ibound(0) |
| 5562 | DSB%(1)= INT DURATION%(0)/Ibound(1) |
| 5564 | DSB%(2)= INT DURATION%(0)/Ibound(2) |
| 5565 | DSB%(3)= INT DURATION%(0)/Ibound(3) |
| 5566 | DSB%(4)= INT DURATION%(0)/Ibound(4) |
| 5570 | DSB%(5)= INT DURATION%(0)/Ibound(5) |
| 5572 | DSB%(6)= INT DURATION%(0)/Ibound(6) |
| 5574 | DSB%(7)= INT DURATION%(0)/Ibound(7) |
| 5576 | DSB%(8)= INT DURATION%(0)/Ibound(8) |
| 5578 | DSB%(9)= INT DURATION%(0)/Ibound(9) |
| 5580 | DSB%(10)= INT DURATION%(0)/Ibound(10) |
| 5582 | DSB%(11)= INT DURATION%(0)/Ibound(11) |
| 5584 | DSB%(12)= INT DURATION%(0)/Ibound(12) |
| 5586 | DSB%(13)= INT DURATION%(0)/Ibound(13) |
| 5588 | DSB%(14)= INT DURATION%(0)/Ibound(14) |
| 5590 | DSB%(15)= INT DURATION%(0)/Ibound(15) |
| 5592 | DSB%(16)= INT DURATION%(0)/Ibound(16) |
| 5593 | DSB%(17)= INT DURATION%(0)/Ibound(17) |
| 5594 | DSB%(18)= INT DURATION%(0)/Ibound(18) |
| 5595 | DSB%(19)= INT DURATION%(0)/Ibound(19) |
| 5596 | DSB%(20)= INT DURATION%(0)/Ibound(20) |
| 5597 | DSB%(21)= INT DURATION%(0)/Ibound(21) |
| 5598 | DSB%(22)= INT DURATION%(0)/Ibound(22) |
| 5599 | DSB%(23)= INT DURATION%(0)/Ibound(23) |
| 5600 | DSB%(24)= INT DURATION%(0)/Ibound(24) |
| 5601 | DSB%(25)= INT DURATION%(0)/Ibound(25) |
| 5602 | DSB%(26)= INT DURATION%(0)/Ibound(26) |
| 5603 | DSB%(27)= INT DURATION%(0)/Ibound(27) |
| 5604 | DSB%(28)= INT DURATION%(0)/Ibound(28) |
| 5605 | DSB%(29)= INT DURATION%(0)/Ibound(29) |
| 5606 | DSB%(30)= INT DURATION%(0)/Ibound(30) |
| 5607 | DSB%(31)= INT DURATION%(0)/Ibound(31) |
| 5608 | DSB%(32)= INT DURATION%(0)/Ibound(32) |
| 6000 | FOR Y=1 TO N |
| 6010 | IF DURATION%(Y) > DSB%(0) THEN PRINT "ERROR IN MESSAGE (";Y;")": M(Y)=127:GOTO 8000 |
| 6020 | IF DURATION%(Y) > DSB%(1) THEN M(Y)=0:GO TO 8000 |
| 6030 | IF DURATION%(Y) > DSB%(2) THEN M(Y)=1:GO TO 8000 |
| 6040 | IF DURATION%(Y) > DSB%(3) THEN M(Y)=2:GO TO 8000 |
| 6050 | IF DURATION%(Y) > DSB%(4) THEN M(Y)=3:GO TO 8000 |
| 6060 | IF DURATION%(Y) > DSB%(5) THEN M(Y)=4:GO TO 8000 |
| 6070 | IF DURATION%(Y) > DSB%(6) THEN M(Y)=5:GO TO 8000 |
| 6080 | IF DURATION%(Y) > DSB%(7) THEN M(Y)=6:GO TO 8000 |
| 6090 | IF DURATION%(Y) > DSB%(8) THEN M(Y)=7:GO TO 8000 |
| 6100 | IF DURATION%(Y) > DSB%(9) THEN M(Y)=8:GO TO 8000 |
| 6110 | IF DURATION%(Y) > DSB%(10) THEN M(Y)=9:GO TO 8000 |
| 6120 | IF DURATION%(Y) > DSB%(11) THEN M(Y)=10:GO TO 8000 |
| 6130 | IF DURATION%(Y) > DSB%(12) THEN M(Y)=11:GO TO 8000 |
| 6140 | IF DURATION%(Y) > DSB%(13) THEN M(Y)=12:GO TO 8000 |
| 6150 | IF DURATION%(Y) > DSB%(14) THEN M(Y)=13:GO TO 8000 |
| 6160 | IF DURATION%(Y) > DSB%(15) THEN M(Y)=14:GO TO 8000 |
| 6170 | IF DURATION%(Y) > DSB%(16) THEN M(Y)=15:GO TO 8000 |
| 6171 | IF DURATION%(Y) > DSB%(17) THEN M(Y)=16:GO TO 8000 |
| 6172 | IF DURATION%(Y) > DSB%(18) THEN M(Y)=17:GO TO 8000 |
| 6173 | IF DURATION%(Y) > DSB%(19) THEN M(Y)=18:GO TO 8000 |
| 6174 | IF DURATION%(Y) > DSB%(20) THEN M(Y)=19:GO TO 8000 |
| 6175 | IF DURATION%(Y) > DSB%(21) THEN M(Y)=20:GO TO 8000 |
| 6176 | IF DURATION%(Y) > DSB%(22) THEN M(Y)=21:GO TO 8000 |
| 6177 | IF DURATION%(Y) > DSB%(23) THEN M(Y)=22:GO TO 8000 |
| 6178 | IF DURATION%(Y) > DSB%(24) THEN M(Y)=23:GO TO 8000 |
| 6179 | IF DURATION%(Y) > DSB%(25) THEN M(Y)=24:GO TO 8000 |
| 6180 | IF DURATION%(Y) > DSB%(26) THEN M(Y)=25:GO TO 8000 |
| 6181 | IF DURATION%(Y) > DSB%(27) THEN M(Y)=26:GO TO 8000 |
| 6182 | IF DURATION%(Y) > DSB%(28) THEN M(Y)=27:GO TO 8000 |
| 6183 | IF DURATION%(Y) > DSB%(29) THEN M(Y)=28:GO TO 8000 |
| 6184 | IF DURATION%(Y) > DSB%(30) THEN M(Y)=29:GO TO 8000 |
| 6185 | IF DURATION%(Y) > DSB%(31) THEN M(Y)=30:GO TO 8000 |
| 6186 | IF DURATION%(Y) > DSB%(32) THEN M(Y)=31:GO TO 8000 |
| 7000 | PRINT "ERROR IN MESSAGE (";Y;")":M(Y)=255:GOTO 8000 |
| 8000 | STORAGE%?Y = M(Y) |
| 8115 | IF STORAGE%?Y=27 THEN PRINT CHR$(32); ELSE PRINT CHR (65+STORAGE%?Y); |
| 8200 | NEXT |
| 8600 | END |

The computer is programmed with the above program to measure the wave durations by recording the time instants as each transition of the wave occurs. The procedure for measuring the wave durations is depicted in the timing diagram shown in FIG. 12.

The RECEIVER 60 thus automatically interprets the interval-coded waves, identifies and outputs the message conveyed, and stores the messages for possible subsequent use.

MESSAGE STORAGE/RETRIEVAL SYSTEM

Figure 13:
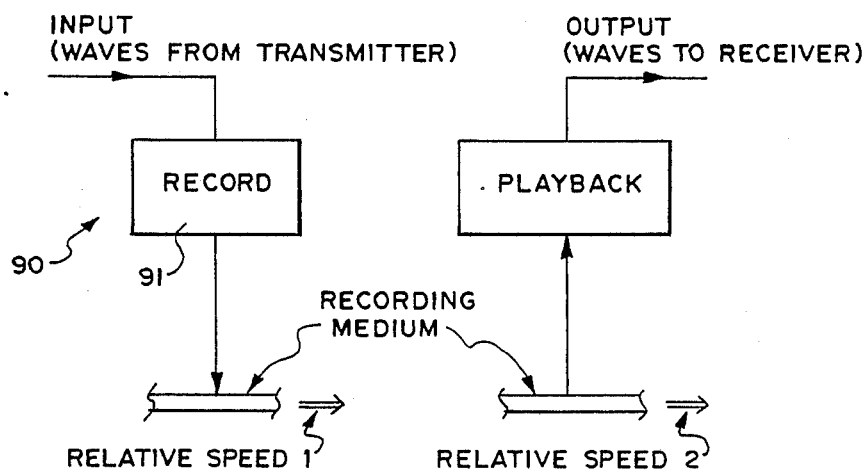
FIG. 13 is a schematic block diagram of a record/playback unit of the system employing a recording media (such as a magnetic tape).

Referring to FIG. 13 there is depicted a novel Message Storage/Retrieval system 90 which may operate at equal or differing speeds during storage and subsequent retrieval, i.e. one novel feature of the invented System is that its principle of operation is independent of the operating speeds.

The System 90 is realized by inserting between the Transmitter 21 and the Receiver 60, a wave-transition record/playback unit such as a magnetic or optical recorder 91. No modification is required on the Transmitter and Receiver in spite of the fact that with differing record and playback speeds the waves first recorded and the waves subsequently retrieved are in different time scales. Such operation is possible because the messages are interval coded and hence, NOT frequency specific.

Figure 14:
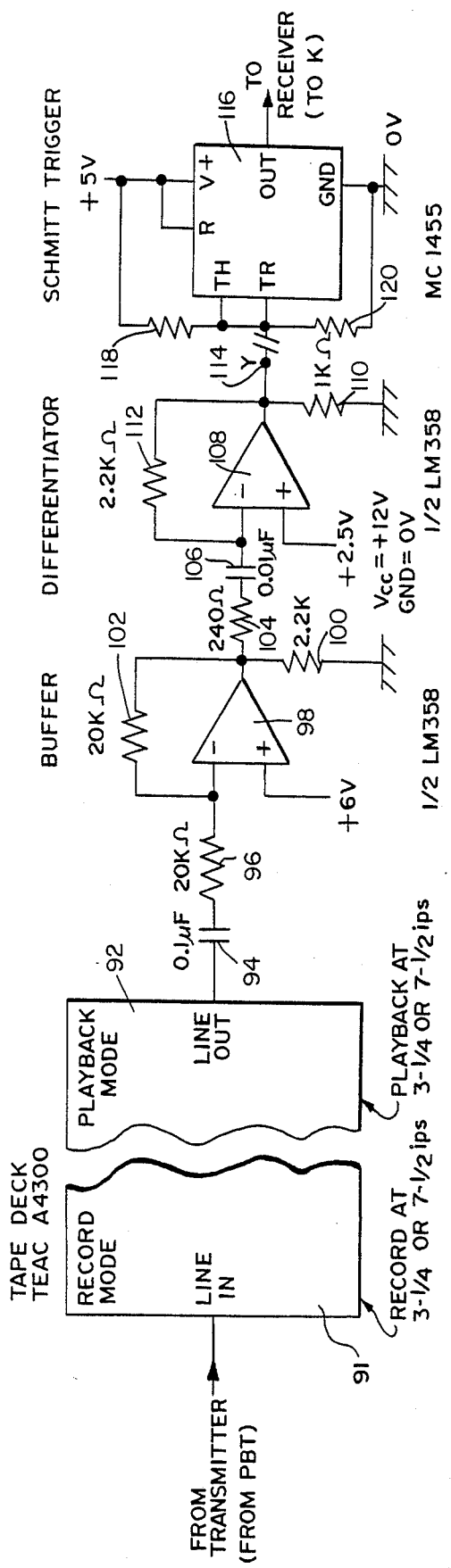
FIG. 14 is a detailed electrical circuit diagram of the record/playback unit shown in FIG. 13.

A possible wave-transition record/playback unit for use in the system 90 can be realized with a commercially available tape deck and additional hardware as shown in FIG. 14. For example, a TEAC (trade mark) A-4300 with open-reel tape Maxell (trade mark) XLI 35-90B is used with its recording level adjusted such that its monitor line output is about 0.6 volts peak-to-peak. Its playback level is adjusted to give a signal of about 2 volts peak-to-peak at circuit point Y.

The Interval-coded waves from the Transmitter 21 are fed to the input LINE IN of the tape deck 91 and recorded at speed 1 (e.g. at 7.5 ips). Upon playback at speed 2 (which may be different to speed 1, e.g. at 3.25 ips) the interval-coded wave first recorded is retrieved and output at LINE OUT of the tape deck operating at playback mode 92. The signal is fed to a buffer, through a capacitor 94 and resistor 96 to the inverting input of an operational amplifier 98 which has a non-inverting input biased to +6 V, i.e. ½ Vcc. A portion of the output of operational amplifier 98 is fed through a resistor 100 to chassis ground and through resistor 102 back to its inverting input. The other portion of the output is fed to a differentiator, through a resistor 104 and capacitor 106 to the inverting input of an operational amplifier 108 which has a non-inverting input biased to +6 V and a portion of its output is fed through resistor 110 to chassis ground and through resistor 112 back to its inverting input. The other portion of the output of the operational amplifier 108 is fed through circuit point Y and capacitor 114 to a Schmitt trigger 116. The Schmitt trigger 16 consists of a MC1455 TIMER with its R and V+ points connected to +5 V, its GND chassis ground, and its input points TH and TR tied together at the mid-point of a potential divider formed with equal resistors 118 and 120 across +5 V and chassis ground. The interval-coded output waves from the Schmitt trigger 116 are fed to the Receiver 60.

The system of the present invention is quite versatile and may be employed in different manners. One such manner would be to use a set of interval-coded durations differing by equal duration increments. (For example using a set of interval-coded durations such as . . . 2494, 2497, 2500, 2503, . . . etc. wherein the duration increment is 3 as practised in a following concrete example.) In this manner of MI coding it should be noted that if the least duration in the set is predetermined and the magnitude of the equal duration increment also predetermined then there is a preferred number of interval-coded durations for the set, i.e. a preferred coding for speedy transmissions of random information as indicated in TABLE III.

TABLE III

| (EQUAL DURATION INCREMENT) / (LEAST DURATION OF SET) | PREFERRED NUMBER OF STATES FOR CODING |
|---|---|
| 0.2 | 8 |
| 0.07 | 16 |
| 0.025 | 32 |
| 0.0098 | 64 |
| 0.00404 | 128 |
| 0.00172 | 256 |
| 0.15 | 10 |
| etc. | etc. |

TABLE III SHOWS specifically the preferred MI coding, respectively, for each of several cases where the ratio of (equal duration increment)/(at least duration of the set) is predetermined. And the preferred number of interval-coded durations for each case is found to be 8, 16, 32, 64, 128, 256 and 10, respectively.

The use of TABLE III is further explained with the following example: Say, if the least duration and magnitude of duration increment for such coding are chosen to be 100 and 20, respectively, then, from TABLE III, 8-state (1-of-8 message) coding is the preferred coding and in this case the set of interval-coded durations should be 100, 120, 140, 160, 180, 200, 220, and 240.

As a concrete example of this system, using 256-interval coding, it can be achieved by coupling the specific transmitter 21 to the specific receiver 60 described above through a suitable transmission media, with the transmitter 21 programmed with the program hereafter listed:

| Transmitter Program II | | |
|---|---|---|
| 10 | REM INVENTED BY HO KIT-FUN | |
| 15 | REM UNPUBLISHED COPYRIGHT | |
| 20 | REM | |
| 30 | REM P.O. Box 54504 | |
| 40 | REM NORTH POINT | |
| 50 | REM HONG KONG | |
| 60 | REM | |
| 80 | REM PRESTOB25A | |
| 85 | REM | |
| 90 | ?&FE6B=&CO | : REM SET USER 6522 AT FREE-RUNNING MODE |
| 92 | ?&FE62=&80 | : REM INITIALIZE OUTPUT (SET PB7 AT HIGH) |
| 94 | ?&FE6E=&00 | : REM INTERRUPT DISABLED |
| 100 | REM | |
| 110 | REM ESTABLISH MESSAGE-INTERVAL CODING TABLE | |
| 120 | DR%=2509 : REM SET REFERENCE "HALF-CYCLE" DURATION, PROGRAMMABLE | |
| 125 | DD%=3 : REM DURATION INCREMENT | |
| 130 | DELAY%=2 | |
| 140 | DSL%=&4000: "DSH%=&5000 : REM LOCATION OF MI TABLE | |
| 145 | DIM LOCATION%(255) | |
| 150 | FOR M = 0 TO 255 : REM THE MESSAGE IS ANY INTEGER IN THE RANGE 0–255 | |
| 180 | REM (EACH MESSAGE HAS THE SAME INFORMATION CONTENT AS 8 BINARY BITS) | |
| 200 | DS%=DR%−M*DD% : REM COMPUTE SIGNAL "HALF-CYCLE" DURATION | |

-continued

| | Transmitter Program II | |
|---|---|---|
| 230 | DS%=DS%–DELAY% : REM DELAY CORRECTION | |
| 232 | REM TRUE DURATION = PROGRAMMED DURATION + DELAY | |
| 235 | DSH%?M=DS% DIV 256 | |
| 238 | DSL%?M=DS% MOD 256 | |
| 240 | NEXT M | |
| 245 | REM: FOR A SPECIFIC RANDOMLY ASSIGNED MI TABLE | |
| 250 | DATA 21,36,51,1 2,111,159,10, | 231,198,40,125 68,220,232,5 |
| 251 | DATA 61,123,222,249 188,215,3,4, | 46,19,92,151, 56,101,223,175 |
| 252 | DATA 77,8,25,26, 105,143,211,6, | 97,132,255,69, 90,228,196,203 |
| 253 | DATA 83,49,126,119, 208,29,30,224, | 246,9,43,117, 138,139,13,17 |
| 254 | DATA 157,182,201,127, 55,28,115,187, | 52,33,147,113, 194,243,64,22 |
| 255 | DATA 59,226,238,200, 66,72,229,240, | 87,190,41,15, 253,75,31,23 |
| 256 | DATA 122,18,45,62, 44,245,109,93, | 191,205,24,221, 42,14,186,227 |
| 257 | DATA 155,154,153,39, 95,100,169,207, | 11,71,76,104, 216,144,131,120 |
| 258 | DATA 150,140,130,160, 177,166,48,73, | 168,212,233,244, 96,112,165,172 |
| 259 | DATA 133,170,219,242, 136,145,146,213, | 27,53,78,108, 236,250,199,50 |
| 260 | DATA 184,185,148,60, 178,209,210,241, | 16,80,82,98, 152,54,57,114 |
| 261 | DATA 110,70,32,86, 206,116,65,67, | 89,135,197,247, 74,141,204,239 |
| 262 | DATA 252,156,174,134, 202,149,161,217, | 84,88,158,230, 91,94,103,118 |
| 263 | DATA 128,99,106,102, 192,193,189,181, | 225,171,163,167, 179,195,176,0 |
| 264 | DATA 137,237,107,38, 58,173,218,251, | 164,235,183,20, 35,63,124,162 |
| 265 | DATA 214,79,37,142, 234,248,254,34, | 180,81,12,129, 47,85,7,121 |
| 268 | LOCATION%=&3800 | |
| 270 | FOR MESSAGE% = 0 TO 255 | |
| 272 | READ M | |
| 275 | LOCATION%?(MESSAGE%) = M | |
| 280 | NEXT | |
| 290 | REM INPUT MESSAGES | |
| 300 | N=128 : REM TAKE N INPUT MESSAGE UNITS (N =1,11,128 ETC., PROGRAMMABLE) | |
| 320 | DTA%=&3000 : ?DTA%=N | |
| 330 | FOR NUM% = N TO 1 STEP –1 | |
| 340 | INPUT MESSAGE% :REM e.g. CONFIDENTIAL DIGITAL DATA | |
| 350 | DTA%?(NUM%)=LOCATION%?(MESSAGE%) | |
| 360 | NEXT | |

(Lines 390 t0 770 same as in Transmitter Program I above)

The receiver 60 of FIGS. 9 and 11 may be employed with Microcomputer 66, programmed with the following program.

| | Receiver Program II |
|---|---|
| 5000 | REM INVENTED BY HO KIT-FUN |
| 5001 | REM UNPUBLISHED COPYRIGHT |
| 5002 | REM |
| 5004 | REM P.O. BOX 54504 |
| 5006 | REM NORTH POINT |
| 5008 | REM HONG KONG |
| 5010 | REM |
| 5020 | REM PRESTOL23A |
| 5050 | N=128 : REM NUMBER OF SIGNALS |
| 5060 | n=N+1 : REM NUMBER OF WAVES |
| 5070 | CONSTANT1%=128*256 |
| 5080 | DIM Ibound(256),DSB(257),CTIME%(n), DURATION%(N), STORAGE%(N),M(256),LOCATION%(256) |
| 5090 | HTIME=&5500 |
| 5100 | LTIME=HTIME+n+1 |
| 5105 | STORAGE%=&4000 : REM STORAGAE LOCATION |

| | Receiver Program II | |
|---|---|---|
| 5107 | REM INTERVAL BOUNDARIES AS PER TRANSMITTER MI TABLE, i.e. "DSB=DR%–(m–0.5)*DD%" AND "Ibound(M)=DR%/DSB" | |
| 5108 | FOR m=0 TO 256:Ibound(m)=2509/(2509–(m–0.5)*3): NEXT:REM INTERVAL BOUNDIES | |

(Lines 5110 to 5555 same as Receiver Program I, above)

| 5560 | FOR m=0 TO 256:DSB(m)=DURATION%(0)/Ibound(m).NEXT | |
| 5570 | REM FOR A SPECIFIC RANDOMLY ASSIGNED MI TABLE | |
| 5600 | DATA 223, 3, 8, 26, 33, 53, 11, 116 | 27, 15, 43, 254 246, 62, 109, 87 |
| 5610 | DATA 164, 63, 97, 21, 102, 34, 35, 148 | 231, 0, 79, 95, 73, 57, 58, 94 |
| 5620 | DATA 178, 69, 251, 236, 6, 86, 108, 54, | 1, 242, 227, 115, 104, 98, 20, 252 |
| 5630 | DATA 138, 49, 159, 2, 28, 174, 232, 80, | 68, 149, 173, 72, 163, 16, 99, 237 |
| 5640 | DATA 78, 186, 88, 187, 89, 139, 188, 93, | 12, 39, 177, 117, 118, 32, 150, 241 |
| 5650 | DATA 165, 245, 166, 48, 197, 180, 44, 204, | 196, 253, 179, 84, 22, 107, 205, 120 |
| 5660 | DATA 140, 36, 167, 209, 119, 40, 210, 226, | 121, 29, 211, 206, 151, 106, 176, 9 |
| 5670 | DATA 141, 71, 175, 74, 127, 255, 96, 17, | 180, 55, 207, 51, 238, 7, 50, 67 |
| 5680 | DATA 208, 247, 130, 126, 152, 224, 60, 61, | 37, 144, 195, 181, 129, 189, 243, 41 |
| 5690 | DATA 125, 153, 154, 70, 172, 114, 113, 112, | 162, 201, 128, 23, 193, 64, 198, 10 |
| 5700 | DATA 131, 202, 239, 214, 132, 122, 145, 213 | 228, 142, 137, 215, 143, 233, 194, 31 |
| 5710 | DATA 222, 136, 168, 220, 160, 161, 110, 75, | 244, 219, 65, 230, 24, 218, 85, 100 |
| 5720 | DATA 216, 217, 76, 221, 83, 66, 200, 47, | 46, 182, 5, 158, 190, 101, 184, 123 |
| 5730 | DATA 56, 169, 170, 42, 124, 203, 234, 146 | 133, 155, 240, 25, 13, 103, 18, 30 |
| 5740 | DATA 59, 212, 81, 111, 14, 134, 248, 229 | 45, 90, 199, 4, 156, 225, 82, 191 |
| 5750 | DATA 91, 171, 147, 77, 249, 19, 157, 235, | 135, 105, 52, 183, 192, 92, 250, 38 |
| 5800 | LOCATION%=&6000 | |
| 5820 | FOR M=0 TO 255 | |
| 5840 | READ MESSAGE% | |
| 5860 | LOCATION%?M=MESSAGE% | |
| 5880 | NEXT | |
| 6000 | FOR Y=1 TO N | |
| 6010 | IF DURATION%(Y) DSB(0) THEN PRINT "ERROR IN MESSAGE (";Y;")": M(Y)=127: GOTO 8000 | |
| 6020 | m=1 | |
| 6030 | IF DURATION%(Y)> DSB(m) THEN M(Y)=m–1 : GOTO 8000 | |
| 6040 | m=m+1 | |
| 6045 | IF m=257 THEN PRINT "ERROR IN MESSAGE (";Y'")" : M(Y)=255: GOTO 8000 | |
| 6050 | GOTO 6030 | |
| 8000 | STORAGE%?Y =LOCATION%?M(Y) | |
| 8100 | PRINT "MESSAGE (";Y;") = ";STORAGE%?Y :REM DISPLAY CONFIDENTIAL DATA | |
| 8200 | NEXT | |
| 8300 | END | |

With the system so constituted a 256-state MI Table is provided in the system. An example of such a table is as follows:

TABLE IV

| MESSAGE UNIT | $D_R$ | $D_S$ | I |
|---|---|---|---|
| 223 | 2509 | 2509 | 2509/2509 |
| 3 | 2509 | 2506 | 2509/2506 |
| 8 | 2509 | 2503 | 2509/2503 |
| 26 | 2509 | 2500 | 2509/2500 |
| 27 | 2509 | 2497 | 2509/2497 |
| 15 | 2509 | 2494 | 2509/2494 |
| 43 | 2509 | 2491 | 2509/2491 |

TABLE IV-continued

| MESSAGE UNIT | $D_R$ | $D_S$ | I |
|---|---|---|---|
| 254 | 2509 | 2488 | 2509/2488 |
| 33 | 2509 | 2485 | 2509/2485 |
| 53 | 2509 | 2482 | 2509/2482 |
| . | . | . | . |
| . | . | . | . |
| . | . | . | . |
| 192 | 2509 | 1753 | 2509/1753 |
| 92 | 2509 | 1750 | 2509/1750 |
| 250 | 2509 | 1747 | 2509/1747 |
| 38 | 2509 | 1744 | 2509/1744 |

(256 randomly-paired MI coding)

Wherein each of the 256 message units may be arbitrarily assigned letters and numbers or other digital data. When many-state, such as this 256-state MI coding is used the system is especially suitable for data transmission, confidential data in particular. Using a random order in the MI coding, such as that shown in TABLE IV would add a layer of complexity, making it difficult to break as a code.

At the Transmitter 21 each confidential 256-state message is transformed into an interval-coded wavelet (that means 1 byte of information at a time) according to the secret MI Table, which contains a set of 256 message units each of which has been randomly and uniquely assigned to 1 of 256 interval-coded durations.

At the Receiver 60 such waves are detected and decoded into the original confidential messages 1 byte at a time in accordance with the same secret 256-state MI coding.

It is not practical to guess at the secret MI coding if such coding is not provided since the number of permutations in this case involves 256 factorial and the secret MI coding can be changed from time to time. Hence, such interval-coded waves, even if intercepted at the path between the Transmitter 21 and the Receiver 60 do not easily reveal the messages being conveyed.

By inserting more reference waves into the signal wave stream the Interval-coded-wave System can tolerate greater frequency drifts/shifts. And in the extreme we may choose to transmit a reference wave next to each signal wave such as follows: $W_{R(1)}$, WS(1), WR(2), ..., WR(N), WS(N), which means that the reference may be changed and up-dated for every single message unit for subsequent interval evaulation. Such format permits frequency hopping between message units, wherein the intervals may be respectively defined by the waves WR(1) and $W_S(1)$, WR(2) and WS(2), ..., WR(N) and WS(N), etc.

Furthermore, the process and transmitter of the present invention may be practiced and implemented in another manner to transmit information in the form of interval-coded tones such as interval-coded musical tones (i.e., tones belonging to a musical scale) which are capable of being easily recognized by a human listener who may then identify the information encoded therein. Again, this manner of information transmission is implemented with the MI table of FIG. 4, the process of FIG. 5 and the transmitter of FIG. 6. The transmitted toners are multicycle waveforms. There are shown some suitable waveforms in FIG. 1. As a concrete example, let us assume that we wish to transmit numerical values. We could then make up a MI table with suitable musical intervals such as this:

TABLE V

| Message Unit | Interval | Reference Tone Frequency (Hz) | Signal Tone Frequency (Hz) |
|---|---|---|---|
| — | 0.7500 | 512 | 384 |
| . | 0.8333 | 512 | 463 |
| 0 | 0.9375 | 512 | 480 |
| 1 | 1.000 | 512 | 512 |
| 2 | 1.125 | 512 | 576 |
| 3 | 1.250 | 512 | 640 |
| 4 | 1.333 | 512 | 682 |
| 5 | 1.500 | 512 | 768 |
| 6 | 1.667 | 512 | 854 |
| 7 | 1.875 | 512 | 960 |
| 8 | 2.000 | 512 | 1024 |
| 9 | 2.250 | 512 | 1152 |
| | etc. | | |

FIG. 5 again shows the steps in practicing the process of the present invention. From a start at 12 the first step 14 is to establish the MI Table such as MI Table V (step 14). The next step 16 is to input specific message units M(1) ... M(N) (for example, the message units "—", "1", "5", and "2", using Table V shown above) at step 16 and select the corresponding intervals from the MI Table of 14. The final step 18 is to generate and transmit tones $W_R$, WS(1), etc. (e.g., the tone series "512-Hz tone (reference tone), 384-Hz tone (data tone), 512-Hz tone (data tone), 768-Hz tone (data tone), and 576-Hz tone (data tone)") in accordance with the input of step 16 and when this is done the operation is over at step 20. The currently preferred protocol output sequence is that the reference tone is transmitted first followed by the series of information tones. The series of tones so generated are useful as they carry interval-coded information and include a reference with which the information may be decoded, whereby information transmission may be achieved. The transmitted ted tones may be interpreted by a human listener. (Of course, the information carried by these tones may also be automatically decoded by an above-mentioned Receiver programmed to operate with multi-cycle waves.) It should be noted that a significant advantage of implementing the present invention in this manner is that the tonal difference of such transmitted musical tones may be distinghished by a human listener mor reliably than other tones bearing non-musical intervals. A human listener who is skillful in recognizing the tones of a musical scale may recognize these output tones as tones belonging to a musical scale (interval-coded tones). (Even children would find it easy to recognize a simple musical tone series such as, say, "DO-ME-SO" and distinguish it from, say, "DO-ME-LA".) On hearing the transmitted tone series the listener may subjectively regard the first tone in the series as a reference "DO" of a certain musical scale and hence recognize the transmited tone series as specific tones on that scale due to their interval relationship (e.g., recognizing them as the realtive tone series:

"DO" "SO," "DO" "SO" "RE").

If the MI Table is known and the first tone in the series is also known to be a reference, the listener may therefore interpret the specific information tones in the transmitted tone series as "—", "1", "5", and "2". The system of the present invention provides a tone output method and transmitter operable as an output means in a specific device or system, and may serve as an alternative to visual displays.

Although the specific intervals used in TABLE V belong to a natural (diatonic) scale, corresponding intervals belonging to a slightly different scale such as the equally-tempered scale can also be used satisfactorily.

It should be further noted that one of the advantages of the present system is that its principle of operation is non-frequency specific. A transposed frequency set at another pitch can just as well be adopted in TABLE V to generate tones at a higher or lower pitch without departing from the specific intervals contained therein. This makes numerous similar frequency sets compatible and hence permits greater freedom in the design of system hardware, and makes transmitters at different frequency ranges compatible.

The Transmitter 21 of FIGS. 5 and 6 is employed to carry out the above process. As a specific example of a dedicated version for carrying out the above process for tones (multi-cycle waves) the transmitter has been constructed using a microcomputer 22, a MI Table 26 having its set of different message units respectively associated to different musical intervals, i.e., intervals belonging to a musical scale, such as those intervals shown in TABLE V above, and a programmable sound generator (e.g., a sound processor chip connected with loudspeaker output) as generator 30 to transmit audible tones as output waves at 32 in the form of multi-cycle waves such as those waveforms shown in FIG. 1. Specific message units from a source such as a keyboard, a memory location or other circuits are sequentially fed to the transmitter at 24.

Figure 15:
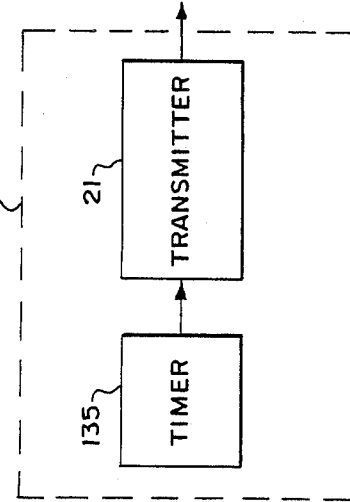
FIG. 15 is a block diagram of a clock employing a transmitter system constructed in accordance with the principles of the present invention.

As another concrete example of the process or system of the present invention, the transmitter is employed to embody a clock 130 shown in FIG. 15 which measures time and which outputs the component digits of the value of time by transmitting interval-coded musical tones 132. These tones "tell" time, and may serve as an alternative to visual displays. This clock is embodied by coupling a timer 135 for measuring time with digital output to and at the front end of the above transmitter 21. This clock has been constructed and successfully operated using the internal timer of the BBC Microcomputer Model B as timer 135, and the same Microcomputer as microcomputer 22, and the standard sound chip (a SN76489 chip) which is already connected with loudspeaker output in same Microcomputer as programmable wave generator 30, and TABLE V as MI Table 26 set up in the RAM of same Microcomputer. A suitable program for the microcomputer 22 of this embodiment is listed below as Transmitter Program III:

Transmitter Program III

```
50 REM INVENTED BY HO KIT-FUN
60 REM UNPUBLISHED COPYRIGHT
80 REM MI TABLE
100 PITCHR=101
120 PITCH1=PITCHR
140 PITCH2=PITCHR+8
150 PITCH3=PITCHR+16
160 PITCH4=PITCHR+20
180 PITCH5=PITCHR+28
200 PITCH6=PITCHR+36
220 PITCH7=PITCHR+44
240 PITCH8=PITCHR+48
260 PITCH9=PITCHR+56
280 PITCH10=PITCHR-4
300 PITCH11=PITCHR-12
320 PITCH12=PITCHR-20
500 REM INPUT RESETTIME
510 INPUT"HOUR",HOUR
```

Transmitter Program III -continued

```
520 INPUT"MINUTE",MINUTE
530 RESETTIME=(60*HOUR+MINUTE)*6000
550 TIME=RESETTIME
600 DIM NOW(6)
610 CHANNEL=1
615 VOLUME=-12
620 DURATION=10
625 PAUSE%=1000
700 ALARMMODE = 0
800 KEY=INKEY(100)
810 IF KEY=32 THEN GOSUB 1040:
    REM PRESS "SPACE BAR" FOR TIME TONES
820 IF KEY=65 THEN GOSUB 3500:
    REM PRESS "A" TO SET ALARM
830 IF ALARMMODE = 1 THEN GOSUB 3800
900 GOTO 800
1030 END
1040 REM REFERENCE AND MESSAGE TONES
1042 SOUND CHANNEL,VOLUME,PITCHR,DURATION
1045 FOR PAUSE=1 TO PAUSE%:NEXT
1050 NOW=TIME : REM READ INTERNAL TIMER
1100 NOW (0)=60
1150 NOW (4)=((NOW DIV 6000)MOD 60)MOD 10
1200 NOW(3)=((NOW DIV 6000)MOD 60)DIV 10
1250 NOW(1)=((NOW DIV 360000)MOD 24)DIV 10
1300 NOW(2) ((NOW DIV 360000)MOD 24)MOD 10
1390 N=0
1400 N=N+1
1420 PRINT N, NOW(N)
1450 IF N=1 AND NOW(N)=0 THEN GOTO 1400
1460 IF N=3 THEN GOTO 3000
1470 IF N=3 AND NOW(N)=0 THEN GOTO 1400
1500 ON NOW(N)+1 GOSUB 2000,2010,2020,2030,2040,
     2050,2060,2070,2080,2090 : REM MI TABLE
1600 SOUND CHANNEL,VOLUME,PITCH,DURATION
1650 FOR PAUSE=1 TO PAUSE%:NEXT
1700 IF N<4 THEN GOTO 1400
1800 RETURN
1900 REM MI TABLE
2000 PITCH=PITCH10
2005 RETURN
2010 PITCH=PITCH1
2015 RETURN
2020 PITCH=PITCH2
2025 RETURN
2030 PITCH=PITCH3
2035 RETURN
2040 PITCH=PITCH4
2045 RETURN
2050 PITCH=PITCH5
2055 RETURN
2060 PITCH=PITCH6
2065 RETURN
2070 PITCH=PITCH7
2075 RETURN
2080 PITCH=PITCH8
2085 RETURN
2090 PITCH=PITCH9
2095 RETURN
3000 FOR PAUSE=1 TO PAUSE%:NEXT
3010 SOUND CHANNEL,VOLUME,PITCHR,DURATION
3015 FOR PAUSE=1 TO PAUSE%:NEXT
3020 GOTO 1470
3200 REM ALARMTONES
3205 ALARMMODE=0
3210 REPEAT
3215 QUIET=0
3220 GOSUB 1040
3230 FOR PAUSE=1 TO 3*PAUSE% : NEXT
3250 QUIET=INKEY(100)
3260 UNTIL QUIET=32 :
    REM PRESS "SPACE BAR" TO STOP ALARM
3280 RETURN
3500 REM SET ALARM
3520 INPUT "HOUR", ALARMHOUR
3530 INPUT "MINUTE", ALARMMINUTE
3540 ALARMTIME =60 * ALARMHOUR + ALARMMINUTE
3550 ALARMMODE = 1
3560 RETURN
3800 REM TESTTIME
3810 IF INT (TIME/6000) = ALARMTIME THEN GOSUB 3200
```

| Transmitter Program III |
|---|
| 3820 RETURN |

In operation the timer 135 keeps the running time. Upon a pre-programmed condition the microcomputer 22 reads the value of the running time from timer 135 and converts it into hour and minute component digits. Then the transmitter 21 takes these specific component digits as message units and responds by transmitting two interval-coded tone series respectively in a specific protocol output sequence representing the component digits of the value of the running time. This sequence of operations is carried out with the above Transmitter Program III. In this current embodiment of the clock 130, depressing a key (on microcomputer 22) causes the clock to output the current value of running time by transmitting a first tone series representing the hour component decimal digits and a second tone series representing the minute component decimal digits of the time. That is, the clock "tells" time by transmitting firstly the "hour" tones followed by the "minute" tones. For simplicity, it is currently preferred that the most significant component digit be supressed if it is a zero. The exact manner of time output in this embodiment is further demonstrated with the following examples: the time, say, 02:35 is transmitted as the tone series "512-Hz tone (reference), 576-Hz tone (least significant hour digit)" followed by the tone series "512-Hz tone (reference), 640-Hz tone (most significant minute digit), 768-Hz tone (least significant minute digit)", whereas the time, say, 10:05 is transmitted as the tone series "512-Hz tone (reference), 512-Hz ton (most significant hour digit), 480-Hz tone (least significant hour digit)" followed by the tone series "512-Hz tone (reference), 768-Hz tone (least significant minute digit)".

This embodiment of the clock therefore enables a human listener to "hear" the time.

The transmitter of the present invention is also employed in a monitor system to provide a novel alarm feature, wherein an alarm condition has been preset and if the same condition is matched the transmitter automatically (and repeatedly if so preferred) transmits the tone series representing the component digits of the current value of a variable being monitored, whereby the transmitted tones may accomplish two purposes, i.e. providing alarm tones while at the same time conveying the updated value of a monitored variable.

Such alarm feature is already successfully embodied in the clock decribed above, using the same Transmitter Program III above, wherein the time for alarm may be preset and upon reaching the same time the clock automatically transmits alarm tones in the form of the above tone series (of clock 130) representing the component digits of the updated time value. Such alarm tones are more informative than conventional alarm tones, as they serve as an alarm while at the same time they convey the current component digits of the running time.

Of course, if preferred the above-mentioned clock may be embodied in the form of a digital watch equipped with sound output.

Figure 16:
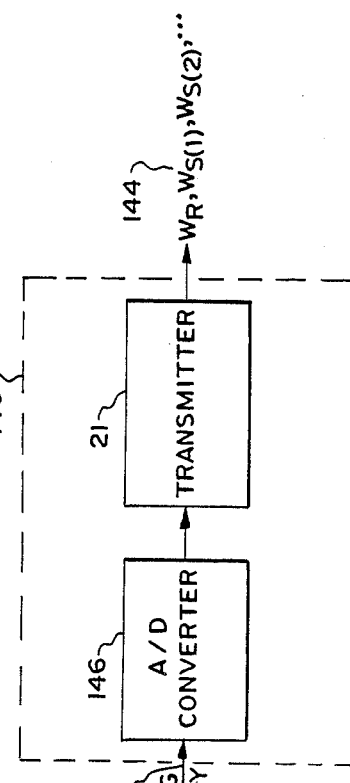
FIG. 16 is a block diagram of a measuring device employing a transmitter system constructed in accordance with the principles of the present invention.

As yet another concrete example to show that the method and system of the transmitter may be employed as an output means in specific devices and instruments, etc., a measuring device 140 is shown in FIG. 16. The device 140 measures a specific analog quantity at input 142 and outputs the component digits of the measured value by transmitting interval-coded musical tones 144, and it is realized by coupling an analog-to-digital converter 146 to and at the front end of transmitter 21. In the following specific example described, the device measures a D.C. voltage (which may be the electrical analog of yet another specific quantity) of magnitude between 0 V and 1.80 V. The device has been constructed and successfully operated by coupling a PD7002 (A/D converter chip) which is already provided in the BBC Microcomputer Model B to the transmitter 21 embodied with the same Microcomputer. In operation the quantity to be measured, in this case a D.C. voltage is input at an analog input channel (e.g., channel 2) of the PD7002 chip. The microcomputer 22 of the transmitter 21 has been additionally programmed to read the corresponding digital output value from the PD7002 and convert this output value into component decimal digits which are subsequently taken as the specific message units. Then the microcomputer 22 of the transmitter 21 operates in the same general manner as described in the earlier embodiments; the transmitter 21 takes the above specific component message units, and subsequently converts and transmits them as interval-coded tones at output 32. A suitable program for the microcomputer 22 to accomplish the operations described is listed as Transmitter Program IV as follows:

| Transmitter Program IV |
|---|
| 50 REM INVENTED BY HO KIT-FUN |
| 60 REM UNPUBLISHED COPYRIGHT |
| 80 REM MI TABLE |
| 100 PITCHR=101 |
| 120 PITCH1=PITCHR |
| 140 PITCH2=PITCHR+8 |
| 150 PITCH3=PITCHR+16 |
| 160 PITCH4=PITCHR+20 |
| 180 PITCH5=PITCHR+28 |
| 200 PITCH6=PITCHR+36 |
| 220 PITCH7=PITCHR+44 |
| 240 PITCH8=PITCHR+48 |
| 260 PITCH9=PITCHR+56 |
| 280 PITCH10=PITCHR−4 |
| 300 PITCH11=PITCHR−12 |
| 320 PITCH12=PITCHR−20 |
| 610 CHANNEL=1 |
| 615 VOLUME=−12 |
| 620 DURATION=10 |
| 625 PAUSE%=1000 |
| 690 KEY=GET |
| 700 REM 0 <= VOLTAGE <= 1.8 |
| 705 VOLTAGE = 1.8*ADVAL(1)/65520 : REM MEASURE VOLTAGE |
| 710 V0 = INT VOLTAGE |
| 720 V1 = INT (VOLTAGE*10)MOD 10 |
| 730 V2 = INT (VOLTAGE*100)MOD 10 |
| 1040 REM REFERENCE AND MESSAGE TONES |
| 1042 SOUND CHANNEL,VOLUME,PITCHR,DURATION |
| 1045 FOR PAUSE=1 TO PAUSE%:NEXT |
| 1490 PRINT V0: |
| 1495 REM MI TABLE |
| 1500 ON V0+1 GOSUB 2000,2010,2020,2030,2040,2050, 2060,2070,2080,2090 |
| 1510 GOSUB 1600 |
| 1518 PRINT "."; |
| 1520 PITCH=PITCH11:GOSUB 1600:REM DECIMAL POINT |
| 1528 PRINT V1; |
| 1530 On V1+1 GOSUB 2000,2010,2020,2030,2040,2050, 2060,2070,2080,2090 |
| 1540 GOSUB 1600 |
| 1548 PRINT V2 |
| 1550 On V2+1 GOSUB 2000,2010,2020,2030,2040,2050, 2060,2070,2080,2090 |
| 1560 GOSUB 1600 |
| 1590 GOTO 690 |
| 1600 SOUND CHANNEL,VOLUME,PITCH,DURATION |

```
                    Transmitter Program IV
1650 FOR PAUSE=1 TO PAUSE%:NEXT
1800 RETURN
1900 REM MI TABLE
2000 PITCH=PITCH10
2005 RETURN
2010 PITCH=PITCH1
2015 RETURN
2020 PITCH=PITCH2
2025 RETURN
2030 PITCH=PITCH3
2035 RETURN
2040 PITCH=PITCH4
2045 RETURN
2050 PITCH=PITCH5
2055 RETURN
2060 PITCH=PITCH6
2065 RETURN
2070 PITCH=PITCH7
2075 RETURN
2080 PITCH=PITCH8
2085 RETURN
2090 PITCH=PITCH9
2095 RETURN
2098 END
```

In this specific example, the device 140 functions as a digital voltmeter. When a voltage of, say, 1.50 V is measured the device converts the measured value into a series of specific message units, in this case into "1", ".", "5", "0" and, in the general manner described earlier and in accordance with TABLE V, transmits a corresponding interval-coded tone series, in this case the following tone series: "512-Hz tone (reference), 512-Hz tone (data), 463-Hz tone (data), 768-Hz tone (data), 480-Hz (data)". It is understood that other A/D converters, voltage dividers, etc. may be employed in the device for measuring other voltage ranges.

From the several embodiments described, it is clear that the tone output method and the transmitter of the present invention may be practiced and empoyed in various systems and devices, such as digital multimeter, thermometer, pressure meter, etc., and may serve as an alternative output means to visual displays. And in various such embodiments the output protocol can be changed if preferred, such as by using the last tone in the transmitted tone series to code the exponent of the value of the quantity being expressed. For example, still using TABLE V, a value of "350000" is expressed and transmitted as the following tone series: "512-Hz tone (reference), 640-Hz tone (data), 768-Hz tone (data), 682-Hz tone (data)" to convey "3" and "5" followed by four zeros.

From the foregoing description, it will be apparent that the system of the prevent invention provides a method and system for communication which has advantageous over the prior art.

While several embodiments of the system of the invention have been shown and described, changes and modifications may be made to the system without departing from the teachings of the invention and, therefore, the invention is only to be limited as necessitated by the accompanying claims.

I claim:

1. A process for transmitting information consisting of a series of message units selected from a set of defined message units, said transmission process comprising the steps of:
(a) defining the message units comprising the set of defined message units;
(b) assigning a message unit ratio to each defined message unit;
(c) providing a periodic reference signal having a reference periodic property;
(d) converting each message unit of the information to be transmitted into a set of signals including said reference signal, each message unit being a member of the set of defined message units and related to said reference signal by a specific message unit ratio;
(e) providing an information signal having an information periodic property, said information periodic property being varied for each message unit to conform to the message unit ratio for each message unit;
(f) transmitting said periodic reference signal and said information signal;
(g) receiving said periodic reference signal and said information signal;
(h) determining a received message unit ratio between said reference periodic property and said information periodic property of the received signals;
(i) deconverting said received message unit ratio to a message unit in accordance with the assigned message unit ratio, thereby to convey the information.

2. The process of claim 1 wherein said periodic reference signal is transmitted first followed by said information signal.

3. The process of claim 2 wherein said periodic reference signal and said information signal are audible.

4. The process of claim 1 wherein the period of the periodic reference signal is changed after the information signal has been transmitted with the varied information periodic property for a message unit.

5. The process of claim 4 wherein said reference signal and said information signal are audible.

6. The process of claim 1 wherein said periodic reference signal is audible and said information signal is audible.

7. The process of claim 6 wherein said message unit ratios include ratios which result in said information signal being varied for a message unit in a manner that the information signal is cognizable by a listener as a note of a musical scale, such as a diatonic scale or an equally-tempered scale.

8. The process of claim 6 including the step of assigning the set of defined message units, message unit ratios which are associated with message tone frequencies, including ratios of 1.000, 1.125, 1.333, 1.500, 1.667, 1.825 and 2.000.

9. The process of claim 1 including the steps of: utilizing a first station and a second station; providing and transmitting from said first station a first periodic reference signal and a first information signal; providing and transmitting from said second station a second periodic reference signal and a second information signal; said first periodic reference signal and said second periodic reference signal differing in fundamental frequencies but said steps of defining and assigning of claim 1 being identical in each station.

10. The process of claim 1 wherein said information periodic property is transmitted for one half of the duty cycle of the information signal established by each message unit.

11. A signal transmitter for transmitting a message comprising a series of specific message units taken from a set of possible message units, such as an alphabet, said transmitter comprising:
(1) table means defining each member of the set of possible message units as a ratio relationship;
(b) means coupled to the table means for receiving the series of specific message units, and for sequentially determining the ratio relationship defined for each successive specific message unit of the message;
(c) means coupled to said receiving and determining means for generating electrical signals including a periodic reference signal having a reference periodic property and for generating an information signal having an information periodic property, said information periodic property being varied for each message unit, the information periodic property being related to the reference periodic property by the ratio relationship determined by said determining means, and
(d) output means for coupling said generated signals to transmission means, such as a transmission line or a broadcast radio transmitter or an optical fiber.

12. The transmitter of claim 11 including means for transmitting said periodic reference signal first followed by said information signal.

13. The transmitter of claim 11 including means for transmitting said information periodic property for one half of the duty cycle of the information signal established by each message unit.

14. The transmitter of claim 11 including means for transmitting the series of information signals by sequentially transmitting a single half word.

15. The transmitter of claim 11 including means for changing the period of the periodic reference signal after the information signal has been transmitted with the varied information periodic property for a message unit.

16. A signal receiver for receiving and decoding electrical signals comprising:
(a) an input unit for receiving electrical signals, including a reference signal and an information signal, each having a periodic property, and for determining the periodic property of received information and reference signals;
(b) table means for defining each member of a set of possible message units, such as an alphabet, as different specific ratio relationships between an information periodic property of the information signal and a reference periodic property of the reference signal;
(c) means intercoupled with said table means and said input unit for computing the ratio relationship between the information periodic property and the reference periodic property for producing a series of message units from said table means in response to the computed ratio relationships determined from the received signals;
(d) output means coupled to said intercoupled means for reproducing the series of message units defined by said last named means.

17. The receiver of claim 16 including means for receiving said reference signal first followed by said information signal.

18. The receiver of claim 16 wherein said table means includes means for defining a message unit for a continuous range of ratios between certain specific values.

19. The receiver of claim 16 including means for sequentially receiving a variety of reference signals having distinguishable periodic properties.

20. A tone transmitter for transmitting information comprising a series of specific message units taken from a set of possible message units, such as an alphanumeric set, said transmitter comprising:
(a) means for assigning each member of the set of possible message units a message tone at a frequency representative of a specific tone frequency ratio to a reference tone frequency to form the series of specific message units;
(b) means for receiving the series of specific message units;
(c) means coupled to said assigning means and said receiving means for sequentially transmitting the reference tone frequency and the assigned message tone for each of said specific message units.

21. The tone transmitter of claim 20 including means for transmitting the reference tone frequency first folowed by the series of message tones.

22. The tone transmitter of claim 20 wherein the specific tone frequency ratios include ratios which result in the assigned message tone being cognizable by a listener as a note of a musical scale, such as diatonic scale or an equally-tempered scale.

23. The tone transmitter of claim 20 including means for assigning the set of possible message units, message tones, respectively, including those tones of frequencies representative of specific tone frequency ratios 1.000, 1.125, 1.250, 1.333, 1.500, 1.667, 1.875, and 2.000.

24. The tone transmitter of claim 20 including means for changing the reference tone frequency following the transmission of a message tone.

25. A tone output device in a digital measuring system for measuring a specific digital quantity, comprising:
(a) means for generating audible tones;
(b) means for receiving component digits of a measured value of said specific quantity; and
(c) control means coupled to said generating means and to said receiving means for sequentially generating and transmitting a reference frequency tone and, for each of said received component digits, a message tone at a specific frequency ratio to the frequency of said reference frequency tone, said specific frequency ratio being invariant for a given component digit.

26. The tone output device of claim 25 further including table means for assigning specific frequency ratios for the message tones.

27. The tone output device of claim 25 including means for transmitting the reference frequency tone first followed by a series of message tones.

28. The tone output device of claim 25 wherein the specific frequency ratios include ratios which result in the specific message tone being cognizable by a listener as a note of a musical scale, such as a diatonic scale or an equally-tempered scale.

29. The tone output device of claim 25 including means for assigning to a set of digits, message tones, respectively, including those tones of frequencies representative of specific frequency ratios 1.000, 1.125, 1.250, 1.333, 1.500, 1.667, 1.875, and 2.000.

30. A clock with tone output means, comprising:
(a) means for measuring time represented by component digits;

(b) means coupled to said measuring means for converting each of said component digits into a message tone at a specific frequency ratio to a reference frequency tone, said specific frequency ratio being invariant for a component digit;
(c) means coupled to said converting means for relating and transmitting said message tone and said reference frequency tone in sequential order in a tone series, whereby the time value may be transmitted.

31. The clock of claim 30 including means for transmitting the reference frequency tone first followed by a series of message tones.

32. The clock of claim 30 wherein the specific frequency ratios include several specific frequency ratios which result in a specific message tone which is cognizable by a listener as a note of a musical scale, such as a diatonic scale or an equally-tempered scale.

33. The clock of claim 30 wherein the specific frequency ratios include tone frequency ratios 1.000, 1.125, 1.250, 1.333, 1.500, 1.667, 1.875, and 2.000.

34. The clock of claim 30 including means for detecting a predetermined condition, such as a depressed key or passing of the time for alarm, and for causing the clock automatically to transmit an alarm tone series including the reference frequency tone and the message tones for the specific component digits of the time.

35. An analog voltage measuring device for representing a measured voltage, comprising:
(a) first means for converting an analog voltage component to representative component digits;
(b) second means coupled to said first converting means for converting each of said component digits into a message tone at a specific tone frequency ratio to a reference frequency tone, said specific tone frequency ratio being invariant for a component digit; and
(c) means coupled to said second converting means for relating and transmitting said message tones and said reference frequency tone in sequential order in a tone series, whereby the measured voltage may be transmitted.

36. The measuring device of claim 35 including means for transmitting the reference frequency tone first followed by the series of message tones.

37. The measuring device of claim 35 wherein the specific tone frequency ratios include ratios which result in a message tone being cognizable by a listener as a note of a musical scale, such as a diatonic scale or an equally-tempered scale.

38. The measuring device of claim 35 wherein the specific tone frequency ratios include 1.000, 1.125, 1.250, 1.333, 1.500, 1.667, 1.875, and 2.000.

* * * * *